Patented Dec. 14, 1926.

1,610,408

UNITED STATES PATENT OFFICE.

WILLIAM BURNHAM ALEXANDER, OF PLAINFIELD, NEW JERSEY, ASSIGNOR, BY MESNE ASSIGNMENTS, TO JAY H. MAGOON, OF LACON, ILLINOIS.

ABSORPTION MEDIUM AND ART OF PRODUCING THE SAME.

No Drawing.   Application filed October 24, 1919.   Serial No. 333,087.

My discovery relates to the production of anhydrous carbonized aluminum-silicate prepared from clay, or mixtures of alumina and silica, naturally impregnated with hydrocarbons, which, in the moist state without preliminary drying, calcining, burning, granulating, crushing or screening, are placed in closed vented tubes or other containers and subjected to a gradually increasing temperature, usually limited to 1200 degrees Fahrenheit, until all moisture volatile matter and water of constitution have been driven off. By the term "gradually increasing temperature" it is meant that the heat must not be applied rapidly enough to break the tubes or retorts. Preferably the heat is applied to raise the temperature as rapidly as the retorts will stand without danger of breaking.

Where in the following claims the term "calcining" is used, it is to be understood that by this term is meant a heating or a heat treatment of the material acted upon to drive off or expel therefrom volatile matter associated therewith.

The residue remaining in the containers is then cooled to below 500 degrees Fahrenheit, when it is removed, ground and screened to produce three (3) grades, to wit:—

1. The coarse grade consists of all that product which will pass a screen with .222 inch openings and will be caught upon a screen having .095 inch openings.

2. The medium grade consists of all that product which will pass a screen with .095 inch openings and will be caught upon a screen having .015 inch openings.

3. The fine grade consists of all that product which will pass a screen with .015 inch openings and will be caught upon a screen having .006 inch openings.

These three grades of dehydrated and carbonized aluminum-silicate become useful for the attraction, extraction and absorption of a wide variety of fluids of low surface tension diffused, intermixed, emulsified or otherwise non-chemically combined with fluids of higher surface tension.

The anhydrous carbonized aluminum-silicate thus produced is a stable compound microscopically porous, conchoidal in fracture, dead black in color and of remarkable uniform quality. An average of several analyses shows that the composition is about as follows:—

|  | Per cent. |
|---|---|
| Carbon | 10 |
| Alumina | 36 |
| Silica | 50 |
| Iron oxide | 2 |
| Lime and magnesia | 1.5 |

Carbonaceous clays are widely distributed throughout the world. Such clays suitable for reduction to carbonized anhydrous aluminum silicate for fluids separation purposes usually occur in glaciated regions and are derived from the disintegration of feldspar. The hills and mountain tops have been scored leaving slight depressions wherein are laid down shallow deposits of perpetually moist carbonaceous kaolinite more or less intermixed with impurities. These deposits rest upon formations impervious to water and usually there is a thin covering of surface soil and vegetation. I have found the clay, in some places, at the grass roots, and in others, at several feet below the surface.

By omitting the preliminary step of drying, the natural carbonaceous clay retains its full organic cell-like development or structure, so that, upon reduction, by the application of heat thereto, in a closed vented container, the said minute cells, pores or openings, are freed of their contents, which consist of volatile organic matter, and are made thereby fully available for the absorption of fluids of low surface tension in the presence of those of higher surface tension.

If the natural clay, before proceeding to the step of reduction, is first dried, considerable of the volatile matter is lost to the atmosphere together with the entrained water, so that the cell-like openings collapse and, to a large extent, do not become available for the absorption of the fluids of low surface tension, The substance produced from carbonaceous clay by preliminary drying followed by reduction at high temperature, in a closed vented retort, is more friable, and, in service, breaks down more readily into slimes, thereby increasing the difficulty in filtration and handling, than a medium which has been produced by subjecting the natural moist carbonaceous clay to reduction at high temperature, without previous drying.

By direct introduction of the carbonaceous clay to retorts at high temperature, without exposure to oxidation, I have produced a substance of marked increased efficiency in action, as a fluid separation medium, from that produced by the same or similar raw material which has been dried prior to reduction. The said substance is of a different structure and surface configuration than the material produced with the step of preliminary drying.

The problem of fluids separation is one of wide application. Water supplies are becoming increasingly contaminated with objectionable fluids of organic character, which include not only inert plant wastes, soil, etc., but also agencies and products of decomposition. These latter, unless sterilized, are a menace to the public health, and even if chemically treated by the usual means for the destruction of organic life, they are positively objectionable, because the products of decomposition have not been removed.

In the preparation of edible oils, paint oils, lubricating oils, as well as refined cane sugar, dye house products, ice manufacture, etc., the highest aim of the management is to extract from these products, not only all inert suspensions, but also fluids which are usually of decomposition, such as fatty acids, esters, soaps, etc., as well as other decomposition products, which, if allowed to remain, not only impart objectionable color and flavor to the products, with particular reference to those designed for human consumption, but also, in fact, generally prohibit their use for the purposes intended.

In the case of raw cane sugar solutions, after a mechanical filtration with intermixed and chemically inert straining medium or by other processes, the solutions will generally contain organic life together with the products thereof which, unless quickly removed, will rapidly disintegrate the solutions with a development of invert sugar and consequent loss.

It is a common practice to absorb these suspensions and intermixed fluids in granular bone char which, for the most part, is a simple physical phenomena based upon surface tension and the activity of a minutely porous and carbonized medium, although it has been considered possible that the calcium phosphate of the bone char might react to some extent, with the acid products of decomposition.

It is now believed that chemical reactions are non-essential except probably when they may be so controlled as to prepare the fluids for absorption, but in a majority of cases simple absorption is sufficient and reactions should be avoided because of the unnecessary complications arising therefrom.

If raw sugars of the normal density in the refining process are intermixed with a small percentage (from 3% to 12%) of fine ground quartz or diatomite, the mixture agitated and filtered through a press at seventy degrees C. or thereabouts, and if the filtrate is immediately passed into mass contact with and slowly through a filter column of my anhydrous carbonized aluminum silicate, ground to between 20 and 40 mesh, the solution is efficiently decolorized, and the soluble salts (ash) are removed to a great extent, often reaching ninety-five per cent of the total contents in the original solution. The filtrate is substantially sterile and none of the medium is dissolved, nor does the process include any chemical or other reaction except possibly that of a slight molecular distortion, which sometimes accompanies the absorption of one fluid from another.

If the same process is carried out, utilizing as a medium anhydrous carbonized aluminum silicate, prepared by drying and crushing naturally hydrocarbon impregnated clay before its reduction, the decolorizing effect is inferior and the ash contents are usually but slightly affected, sometimes increased, and a part of the medium breaks down into slimes which both obstruct the filtering processes and contaminate the filtrate.

I have often purified fluids contaminated with micro-organic activity by simple contact with my absorbent medium, herein described as anhydrous carbonized aluminum silicate prepared from naturally carbonaceous clay, which has been reduced at high temperature without previous drying. A specific example is a deep well at Pelham, New York, which was abandoned because of the known contamination and the presence therein of Bacillus coli, communis type, in large quantities although the water exhibited a high degree of clarity and brilliancy in appearance. I succeeded in purifying this water, without the aid of chemical sterilization, by passing the same through a layer of fine beach sand followed immediately by a mass contact with my insoluble anhydrous carbonized aluminum silicate prepared as herein described, so that no trace of the organisms remained, and the water, according to independent sampling and bacteriological examinations, was declared to be of high purity and safe for domestic consumption.

I have attempted to purify the same water by passing it through a medium composed of naturally hydrocarbon impregnated clay which was first dried, then crushed, followed by reduction in a closed vented retort, but without success. This has proven beyond a doubt that the absorbent medium which I use is distinctly novel and has never before been employed for these purposes.

As an example of the service which may be secured from this material, we will consider an industrial plant utilizing exhaust steam from reciprocating engines for the heating of dye solutions, vegetable oils, evaporating and drying apparatus by contact with coils through which the exhaust steam is made to pass. There is considerable condensate resulting from this process and generally by reason of contamination through leaks the hot distilled water condensate is wasted to the sewer. If this condensate is conveyed to a receiver and there brought into contact with the No. 2 anhydrous carbonized aluminum-silicate product above described, the lubricating oils, soaps, vegetable oils, dyes, etc. will be attracted, extracted, and absorbed, and clean hot distilled water will then become available for boiler-feed, industrial or domestic purposes.

In the manufacture of distilled water ice, one of the principal problems has been the total elimination of all discoloration, odor and flavor from that product. The water used in the manufacture of the ice is passed respectively through the boilers, engines, process pumps and condensers, and in this process has gathered a variety of lubricating oils and other hydrocarbons which are difficult to remove. Ice plants of this character not only waste a considerable quantity of water from the exhaust line separators but also skim off oil with an appreciable quantity of water from the surface of what is called a reboiling tank after which all condensate passes through charcoal filters, fibre disc filters and a large variety of equipment in the vain endeavor to eliminate the discolorations, and disagreeable odors and flavors from the ice or distilled water product caused by cylinder oil, algæ and foul matter from circulating waters, etc.

If the condensate does not contain any large quantity of solids in suspension, algæ or other organisms, when it leaves the condeners and, while still warm or hot, is allowed to pass into intimate contact with ground anhydrous carbonized aluminum-silicate of the fineness of the No. 2 grade above mentioned at the rate of seventy gallons per hour of the said condensate to the cubic foot of the said fluids separation medium, there will be eliminated in the majority of cases practically the last trace of either free or emulsified oil and grease as well as objectionable odors or flavors. Thus fluids of low surface tension will be attracted, extracted and absorbed throughout the mass of the medium without tending to collect in layers or planes as in mechanical straining through voids. Reboiling tanks, filters and skimming tanks may be dispensed with, or, if used, will only serve to decrease the burden upon the fluids separation medium by extracting a part of the free oil, thus permitting the medium to remain in service for a longer period before becoming saturated.

There are some crystallized greases and soap curds as well as organic growths which, if they occur in suspension in the condensate, must be removed by filtration through a fine beach sand filter before the condensate or fluid mixture can be allowed to pass to the fluids separation medium because such contaminations serve to vitiate the absorptive principle of the medium by coating the granules with an insoluble film. In these cases the problem is met by either a series of treatments through several successive receivers containing the same or different grades of the carbonized aluminum-silicate or by subjecting the condensate or fluid mixture to filtration through an ordinary sand clarifying filter before allowing said condensate or fluid mixture to pass into contact with the anhydrous carbonized aluminum-silicate medium.

In the refining of raw sugar syrups, preparatory to evaporation and crystallization, in present practice the discoloration is removed and clarification secured by passing the prepared solution down and through receivers containing bone black or bone char. It has been found that if this solution is passed through and in mass contact with anhydrous carbonized aluminum-silicate, in a receiver, or in receivers arranged in a series containing one or more of the three grades above described, the sugar syrups will be effectively and satisfactorily clarified, no elements will come into the sugar solution from the medium, as in the case of the partly soluble bone black, and the medium may be regenerated, by being again subjected to the temperature of 1200 degrees Fahrenheit in a reducing atmosphere, followed by screening, for an almost indefinite number of times.

In the case of vegetable extractions, such as raw cotton seed oil, it has been found that sometimes in single containers and in other cases by the employment of a series of containers carrying only my fluids separation medium, through and by means of which a mass contact is secured with the said oils, the temperature of which may be raised to facilitate flowing and contact, an excellent and satisfactory decolorization is effected.

Having thus described my new fluids separation medium, its application and the process of manufacture, what I claim and desire to secure by Letters Patent, is:

1. The herein described process which comprises calcining, while excluding air therefrom, carbonaceous clay in its natural moist state.

2. The herein described process which comprises calcining, while excluding air therefrom, carbonaceous clay in its natural moist state, and crushing the calcined clay to granular form.

3. The herein described process which comprises calcining, while excluding air therefrom, carbonaceous clay in its natural moist state, crushing the calcined clay to granular form and screening the same.

4. The herein described process which comprises placing carbonaceous clay in its natural moist state in a retort and thereupon applying heat to the clay in the retort to drive off volatile matter and moisture.

5. The herein described process which comprises removing the natural content of moisture from carbonaceous clay and calcining the same, while excluding air therefrom, all in a single heat treatment.

6. The herein described process which comprises subjecting carbonaceous clay in its natural moist state to heat treatment in an atmosphere formed by the volatile and liquid constituents thereof.

7. The herein described process which comprises placing carbonaceous clay in its natural moist state in a closed vented retort, subjecting the clay in the retort to a temperature increasing from about 300° F. to about 1200° F., cooling the clay after said heat treatment, and crushing the same.

8. An absorption medium comprising a compound derived from calcining, out of contact of air, carbonaceous clay in its natural moist state.

WILLIAM BURNHAM ALEXANDER.